Patented Dec. 18, 1934

1,984,982

UNITED STATES PATENT OFFICE 1,984,982

ESTER OF POLYCARBOXYLIC ACIDS CONTAINING ONE OR MORE ALKOXY METHYLENE GROUPS AND THEIR PRODUCTION

Leonard Nicholl, Nyack, N. Y., assignor to Kay-Fries Chemicals, Inc., West Haverstraw, N. Y., a corporation of New York No Drawing. Application August 9, 1932,
Serial No. 628,059

22 Claims. (Cl. 260—103)

This invention relates to the manufacture of esters or ethers and has for one of its objects the manufacture of esters of polybasic acids containing one or more methylene glycol groups and/or derivatives thereof.

The invention has for another object compounds of dibasic acids such as phthalic, succinic, tartaric or maleic acids containing methylene glycol mono ethers in place of the ordinary alcohol groups, such as ethyl alcohol, butyl alcohol, etc.

In one of its aspects, the invention resides in reacting methylene halide mono ethers with metal salts of the dibasic acids or their half esters, for example, disodium phthalate, mono-sodium phthalate, mono-sodium methyl phthalate or calcium phthalate.

In another of its aspects, the invention resides in reacting metallic salts of dibasic acids or their half esters with methylene halide mono ethers, such as monochlor methyl ether, monochlor methyl ethyl ether, symmetrical dichlor methyl ether, dichlor methyl ether or monobrom methyl methyl ether.

The invention also seeks the reaction of metallic salts of polybasic acids with halogenated polymethylene ether compounds.

Broadly in carrying the invention into effect, one or more carboxyl hydrogens of polybasic acids are replaced by methylene ether groups of the type —$CH_2OR$ where "R" may be any alkyl group, for instance —$CH_3$ or —$CH_2CH_3$, or any cyclic group, as for instance the phenyl group or any substituted alkyl group, for instance —$CH_2NH_2$ or —$CH_2CH_2NH_2$ or
—$CH_2OCH_2OCH_2OCH_3$, or any substituted cyclic group, for instance, the tolyl group or a mixed alyphatic-cyclic group, for instance, the ethyl-phenyl group or derivative thereof.

The invention also seeks a process by which the aforesaid objects may be attained, which is practical from the standpoint of manufacture and of which the product is practical from the standpoint of use.

These and other objects of the invention and the means for their attainment will be more apparent from the following detailed description of one embodiment by which the invention may be realized.

The product of this invention is conveniently one or more compounds of a dibasic acid, such as phthalic, succinic, tartaric, and/or maleic acids, and/or metal salts or half esters of such acids, for example, disodium phthalate or monosodium methyl phthalate or calcium phthalate, reacted with halogen methylene ethers, such as monochlor methyl methyl ether, monochlor methyl ethyl ether, symmetrical dichlor methyl ether, unsymmetrical dichlor-methyl ether or monobrom methyl methyl ether or with halogenated polymethylene compounds such as represented by the formula: $ClCH_2OCH_2OCH_3$.

As an example illustrative of how the invention may be carried into effect, anhydrous sodium phthalate may be reacted with monochlor methyl ether to produce an ester of phthalic acid comprising a methoxy methylene glycol group.

In the preparation of chlor methyl alcohol, I have found that such compound is unstable and that during such preparation monochlor methyl ether is formed. I, therefore, utilize such monochlor methyl ether with the metallic salt of a polybasic acid, such as sodium phthalate, to produce an ester having useful properties, for instance, desirable solvent properties for cellulose esters and ethers, such as cellulose acetate, cellulose nitrate, methoxy cellulose, benzoxy cellulose, etc.

While the anhydrous sodium phthalate may be prepared in different ways, I have found it convenient to dissolve sodium hydroxide in water and then add an equivalent weight of phthalic anhydride at such a rate as to keep the solution near the boiling point. After the phthalic anhydride has all been added, the solution is evaporated to the consistency of a thick paste and then dried to a crystalline mass. It may then be subjected to a temperature of about 70° C., say, in an electric oven, for about two hours, whereafter the temperature is raised to from 110° to 120° C. and maintained for approximately four hours more. At this point in its preparation, it is convenient to remove the material and grind it to the consistency of a fine powder, otherwise the cakes formed will become very hard and difficult to handle. After grinding, the material is again subjected to a temperature of from 110° C. to 120° C. until it is completely dehydrated. This may require heating at such temperature for from eight to fourteen hours.

The monochlor methyl ether may conveniently be prepared in a manner similar to that described, for instance, in "Organic Syntheses"—9–58 (1929), except that at the end of the process, the product may be distilled twice into fractions. I prefer to prepare the chlor methyl ether by passing hydrochloric acid (HCl) into a mixture of a forty percent solution of formaldehyde in water and methanol according to the formula:

The crude chlor methyl ether obtained is first dried with calcium chloride and then fractionally distilled twice. In the second distillation each fraction is refractionated and the product collected within a temperature range of 57° to 58.5° C.

While the reaction mixture may be made in any convenient way, it has been found convenient to first form a suspension of the anhydrous sodium phthalate in, preferably, an excess quantity of some inert solvent such as benzene. I have found good results where 467 parts of dry sodium phthalate are suspended in 500 parts of benzene. The temperature of the solution is then raised, say, to 70°, and thereafter chlor methyl ether is added as rapidly as the heat of the reaction can be removed. 344 parts of the chlor methyl ether are used, preferably, to 467 parts of the sodium phthalate. By the use of an excess of the salt, I find that I avoid the formation of free acid to any appreciable extent, which I have found causes a decomposition of the product, in some circumstances, and thereby reduces the yield of the product.

To insure the completion of the reaction, the reaction mixture is then heated for an appreciable period of time after the ether has all been added. I have heated the reaction mixture for four hours. During the addition of the chlor methyl ether and during the subsequent heating, the reaction mixture is agitated.

The reaction mixture is then cooled. Thereafter the salt formed in the reaction is dissolved out with water, say, 1000 parts of water being added, where the proportions given above are used. This washing may be repeated as many times as is necessary to completely remove the salt, perhaps two or three times.

The reaction mixture is then neutralized, as by washing with, say, a 10% sodium carbonate solution to remove any trace of acid which may have the deleterious effect hereinbefore explained.

The benzol solution is then transferred to a suitable still where the benzene is removed by distillation followed by blowing with air. The crude product thus obtained may be purified by vacuum distillation.

The distilled product is water white. The distillate may have a slight formaldehyde odor, but such has no effect on its properties.

I have found the yield, under ideal conditions, of the methyl ether of methylene glycol phthalate, as I name the product sought by the process hereinbefore described, to be at least as high as 70.0% to 75.0%, based on the chlor methyl ether used.

The reaction may be expressed by the formula:

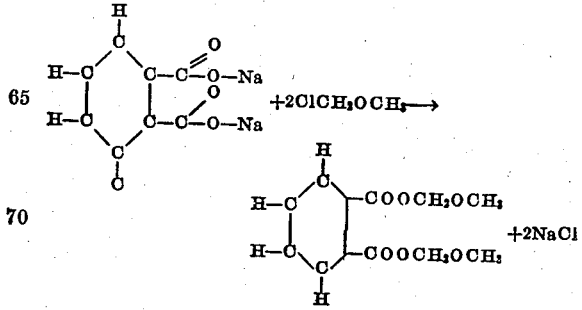

It will be readily apparent from the foregoing description that the invention is not limited to the use of a salt or phthalic acid, in the reaction mixture, but that any salt of a polybasic acid may be used, as, for instance, a salt of succinic or tartaric or maleic acid or dibasic cyclic carboxylic acid or a substituted dibasic cyclic carboxylic acid or a dibasic straight chain unsaturated carboxylic acid or a dibasic substituted straight chain carboxylic acid or of any other polybasic acids which will enter into the reaction in the manner indicated.

It will furthermore be obvious that while I have given, by way of example, a process by which an ester is produced by the reaction of a polybasic acid with chlor methyl ether that I may use any halogen methyl or methylene ether whereby the carboxyl hydrogen of the polybasic acid is replaced by methylene ether groups. Thus every such halogenated polymethylene ether compound, even such having the formula:

may be considered an ether of what may be termed chlor methyl alcohol and may be considered to have the general formula:

Thus X may represent the halogen and R may represent any alkyl, cyclic or substituted alkyl or cyclic group of mixed aliphatic-cyclic group. For instance, I give as an example of an alkyl group a compound having the general formula: $XCH_2OCH_3$; and an example of the cyclic group may be: $XCH_2OC_6H_5$; and an example of a substituted alkyl group may be: $XCH_2OCH_2OCH_3$ or $XCH_2OCH_2NH_2$; and an example of a substituted cyclic group may be:

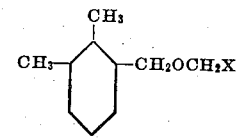

As an example, the reaction of the salt of a substituted dibasic cyclic carboxylic acid with a halogen methyl ether is expressed by the formula:

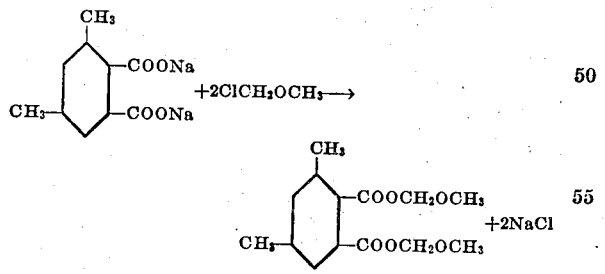

and the reaction of the salt of a dibasic straight chain saturated carboxylic acid with such ether is expressed by the formula:

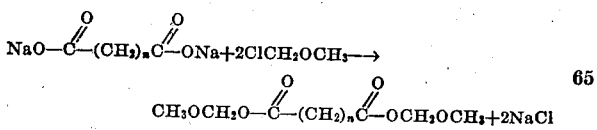

It will be obvious that any polybasic straight or closed chain or a mixed aliphatic-cyclic polybasic or any cyclic carboxylic acid either saturated or unsaturated may be used in the reaction and that such compound may be a substituted one.

The product herein described may be considered either an ether of methylene glycol esters, such as phthalates, or it may be considered a dibasic acid ester of alkoxy methylene glycol.

Various modifications will occur to those skilled in the art in the process by which the product of this invention is obtained as well as in one or more of the steps of such process and in the compounds entering into the several reactions and no limitation is intended by the phraseology of the foregoing description, except as indicated in the appended claims.

It will be understood that the term "aliphatic alcohol radical" is intended to mean an aliphatic radical or a simple substituted aliphatic radical corresponding to that derived from an alcohol by the elimination of the OH group. It is to be understood also that the terms "alkyl" and "aryl" may include simple substitution products formed by replacement of elements which do not result in a substantial change in the properties of the radical.

What is claimed is:—

1. An ester of a polycarboxylic acid in which the hydrogen of at least one of the carboxyl groups is replaced by an alkoxy methylene group.

2. An ester compound having the general formula:

$$R(COO-CH_2OZ)_n$$

in which $R(COO-)_n$ is the radical of a polycarboxylic acid; $n$ is an integer greater than one and Z is an aliphatic alcohol radical which may be the same or different in different parenthetic groups of the formula.

3. An ester compound having the general formula:

$$R(COO-CH_2OZ)_n$$

in which R is an alkyl or aryl radical; $n$ is an integer greater than one, and Z is any aliphatic alcohol radical which may be the same or different in different parenthetic groups of the formula.

4. An ester compound having the general formula:

$$R(COO-CH_2OZ)_2$$

in which $R(COO-)_2$ is a phthalic acid radical and Z is an alkyl group which may be the same or different in the two parenthetic groups of the formula.

5. An ester compound having the general formula:

$$R(COO-CH_2OZ)_2$$

in which $R(COO-)_2$ is a phthalic acid radical and Z is a methyl group.

6. A half ester of a dicarboxylic acid in which the hydrogen of one of the carboxyl groups is replaced by an alkoxy methylene group.

7. An ester of a dicarboxylic acid in which the hydrogen of one of the carboxyl groups is replaced by an alkoxy methylene group and the hydrogen of the other carboxyl group is replaced by an alkyl group.

8. An ester of a dicarboxylic acid in which the hydrogen of one of the carboxyl groups is replaced by a methoxy methylene group and the hydrogen of the other carboxyl group is replaced by a methyl group.

9. A half ester of an aromatic dicarboxylic acid in which the hydrogen of one of the carboxyl groups is replaced by an alkoxy methylene group.

10. An ester compound having the general formula:

$$R(COO-CH_2OZ)_n$$

resulting from the reaction of a polycarboxylic acid salt having the general formula:

$$R(COO-Me)_n$$

in which $R(COO-)_n$ is any polycarboxylic acid radical, Me is a metal, and $n$ is an integer greater than one, and a halogen methylene alkyl ether having the general formula:

$$XCH_2OZ$$

in which X is a halogen and Z is an alkyl group.

11. A half ester having the general formula:

$$HOOC-R-(COO-CH_2OZ)$$

resulting from the reaction of an acid salt of a carboxylic acid having the general formula:

$$HOOC-R-COO-Me$$

in which HOOC—R—COO— is a polycarboxylic acid radical, and Me is a metal, and a halogen methylene ether having the general formula:

$$XCH_2OZ$$

in which X is a halogen, and Z is an alkyl group.

12. A method for the production of esters which comprises reacting a halo-methyl alkyl ether with a metal salt of a polycarboxylic acid in which at least one of the carboxyl groups has the hydrogen thereof replaced by a metal.

13. A method for the production of esters which comprises reacting a halo-methyl alkyl ether with the salt of a polycarboxylic acid so as to form a compound having the general formula:

$$R(COO-CH_2OZ)_n$$

in which $R(COO-)_n$ is the radical of a polycarboxylic acid, $n$ is an integer greater than one and Z is an aliphatic alcohol radical which may be the same or different in different parenthetic groups of the formula.

14. A method for the production of an ester compound which comprises reacting a halo-methyl alkyl ether with the sodium salt of a polycarboxylic acid to form an ester compound having the general formula:

$$R(COO-CH_2OZ)_n$$

in which $R(COO-)_n$ is the radical of a polycarboxylic acid; $n$ is an integer greater than one and Z is an aliphatic alcohol radical which may be the same or different in different parenthetic groups of the formula.

15. A method for the production of an ester compound which comprises reacting a chlormethyl alkyl ether with the sodium salt of a polycarboxylic acid to form an ester compound having the general formula:

$$R(COO-CH_2OZ)_n$$

in which $R(COO-)_n$ is the radical of a polycarboxylic acid; $n$ is an integer greater than one and Z is an aliphatic alcohol radical which may be the same or different in different parenthetic groups of the formula.

16. A method for the production of esters which comprises reacting a halo-methyl alkyl ether with a metal salt of an aromatic polycarboxylic acid to form an ester having the general formula:

$$R(COO-CH_2OZ)_n$$

in which $R(COO-)_n$ is the radical of an aromatic polycarboxylic acid, $n$ is an integer greater than one, and Z is an aliphatic alcohol radical which may be the same or different in different parenthetic groups of the formula.

17. A method for the production of esters which comprises reacting a chlor-methyl alkyl ether with the sodium salt of phthalic acid to form an ester having the general formula:

$$R(COO-CH_2OZ)_2$$

in which $R(COO-)_2$ is the radical of phthalic acid, and Z is an alkyl group which may be the same or different in the two parenthetic groups of the formula.

18. A method for the production of a phthalic acid ester having an alkoxy-methylene group which comprises reacting anhydrous sodium phthalate suspended in an inert solvent with mono-chlor methyl ether at a temperature in the neighborhood of 70° C., cooling the reaction mixture after reaction has taken place, dissolving out the salt which is formed with water and neutralizing the solution.

19. A method for the production of an ester which comprises heating to a reaction temperature a mono-halo methyl ether with an excess of the salt of a polycarboxylic acid suspended in an inert solvent, dissolving the ester formed in the reaction, neutralizing the solution in which the said ester is dissolved and thereafter distilling the solution to separate the said ester.

20. A method for the production of an ester which comprises heating to a reaction temperature a slight excess of the salt of a polycarboxylic acid, suspended in an inert solvent, with a mono-halo methyl ether, dissolving the reaction product in water, neutralizing the solution in which the reaction product is dissolved, and fractionally distilling the solution to remove the said solvent and purifying the ester reaction product by vacuum distillation.

21. A method for the production of mono-esters which comprises reacting a halo-methyl alkyl ether with the acid metal salt of a dicarboxylic acid.

22. A method for the production of mono-esters which comprises reacting a methylene halide mono-ether with the acid metal salt of an aromatic dicarboxylic acid.

LEONARD NICHOLL.